United States Patent
Park et al.

(10) Patent No.: US 9,118,452 B2
(45) Date of Patent: Aug. 25, 2015

(54) METHOD FOR TRANSMITTING AN UPLINK SIGNAL, METHOD FOR RECEIVING AN UPLINK SIGNAL, USER EQUIPMENT, AND BASE STATION

(75) Inventors: Sungjun Park, Gyeonggi-do (KR);
Sungduck Chun, Gyeonggi-do (KR);
Sunghoon Jung, Gyeonggi-do (KR);
Seungjune Yi, Gyeonggi-do (KR);
Youngdae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 14/008,014

(22) PCT Filed: Mar. 27, 2012

(86) PCT No.: PCT/KR2012/002202
§ 371 (c)(1),
(2), (4) Date: Sep. 27, 2013

(87) PCT Pub. No.: WO2012/134138
PCT Pub. Date: Oct. 4, 2012

(65) Prior Publication Data
US 2014/0016593 A1 Jan. 16, 2014

Related U.S. Application Data

(60) Provisional application No. 61/468,565, filed on Mar. 28, 2011.

(51) Int. Cl.
*H04L 5/00* (2006.01)
*H04W 56/00* (2009.01)
*H04W 74/00* (2009.01)

(52) U.S. Cl.
CPC .............. *H04L 5/0091* (2013.01); *H04L 5/001* (2013.01); *H04W 56/0045* (2013.01); *H04W 74/002* (2013.01)

(58) Field of Classification Search
None
See application file for complete search history.

(56) References Cited

U.S. PATENT DOCUMENTS

| 8,995,393 B2 * | 3/2015 | Siomina et al. ............... 370/331 |
| 2009/0238144 A1 | 9/2009 | Cave et al. |

(Continued)

FOREIGN PATENT DOCUMENTS

| JP | 2010-141613 A | 6/2010 |
| JP | 2010-171885 A | 8/2010 |
| KR | 10-2010-0126523 A | 12/2010 |

OTHER PUBLICATIONS

ETSI TS 136 213 V10.0.1, "LTE; Evolved universal terrestrial radio access (E-UTRA); physical layer procedures (3GPP TS 36.213 version 10.0.1 Release 10)", Jan. 2011.

(Continued)

*Primary Examiner* — Bunjob Jaroenchonwanit
(74) *Attorney, Agent, or Firm* — Morgan, Lewis & Bockius LLP

(57) ABSTRACT

The invention relates to a method comprising classifying user equipment (UE) cells, to which carrier aggregation is applied, into a plurality of time advance groups. Uplink-time synchronization is managed using the time synchronization of a primary cell (Pcell) in the time synchronization group to which the primary cell belongs. For other time synchronization groups, the uplink time synchronization is managed using the time synchronization of a secondary cell (SCell) that is particularly set in the relevant time synchronization group. Thus, the plurality of time synchronizations can be effectively managed for the UE and a base station (BS).

13 Claims, 13 Drawing Sheets

(56) References Cited

U.S. PATENT DOCUMENTS

| | | | |
|---|---|---|---|
| 2011/0243066 A1* | 10/2011 | Nayeb Nazar et al. | 370/328 |
| 2011/0243106 A1* | 10/2011 | Hsu et al. | 370/336 |
| 2011/0275335 A1* | 11/2011 | Luo et al. | 455/127.1 |
| 2011/0275374 A1* | 11/2011 | Narasimha et al. | 455/436 |
| 2011/0292790 A1 | 12/2011 | Iwamura et al. | |
| 2011/0292854 A1* | 12/2011 | Terry et al. | 370/311 |
| 2012/0039275 A1* | 2/2012 | Chen et al. | 370/329 |
| 2012/0069803 A1 | 3/2012 | Iwamura et al. | |
| 2012/0083284 A1* | 4/2012 | Harrison et al. | 455/450 |
| 2012/0083308 A1* | 4/2012 | Wang et al. | 455/522 |
| 2012/0213154 A1* | 8/2012 | Gaal et al. | 370/328 |
| 2013/0176981 A1* | 7/2013 | Earnshaw et al. | 370/329 |
| 2013/0215849 A1* | 8/2013 | Heo et al. | 370/329 |
| 2014/0161117 A1* | 6/2014 | Sebire et al. | 370/350 |
| 2014/0185576 A1* | 7/2014 | Lei et al. | 370/329 |
| 2014/0362814 A1* | 12/2014 | Haim et al. | 370/329 |

OTHER PUBLICATIONS

Written Opinion and International Search Report issued in corresponding International Patent Application No. PCT/KR2012/002202 dated Oct. 25, 2012.

* cited by examiner

FIG. 12

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 1, PCell)} |
| R | R | \multicolumn{6}{c}{$P_{CMAX,c}$ 2} |
| P | V | \multicolumn{6}{c}{PH (Type 1, SCell 1)} |
| R | R | \multicolumn{6}{c}{$P_{CMAX,c}$ 3} |

...

| P | V | PH (Type 1, SCell n) |
|---|---|---|
| R | R | $P_{CMAX,c}$ m |

METHOD FOR TRANSMITTING AN UPLINK SIGNAL, METHOD FOR RECEIVING AN UPLINK SIGNAL, USER EQUIPMENT, AND BASE STATION

TECHNICAL FIELD

The present invention relates to a wireless communication system, and more particularly, to a method and apparatus for transmitting and receiving uplink and downlink signals more effectively under a carrier aggregation of a plurality of cells.

BACKGROUND ART

A general wireless communication system performs data transmission and reception through one downlink (DL) band and one uplink (UL) band corresponding to the downlink (in case of a frequency division duplex (FDD) mode), or divides a predetermined radio frame into uplink time unit(s) and downlink time unit(s) in a time domain and performs data transmission and reception through the uplink and downlink time units (in case of a time division duplex (TDD) mode). A base station (BS) and a user equipment (UE) transmit and receive data and/or control information scheduled in a predetermined time unit, for example, a subframe unit. The data are transmitted and received through a data region configured for uplink and downlink subframes, and the control information is transmitted and received through a control region configured for the uplink and downlink subframes. To this end, various physical channels carrying radio signals are configured in the uplink and downlink subframes.

Meanwhile, in the recent wireless communication system, the carrier aggregation (or bandwidth aggregation) technology, which uses greater uplink and downlink bandwidths by aggregating a plurality of uplink and downlink frequency blocks, has been discussed to use a wider frequency band.

FIG. 1 is a diagram illustrating an example of communication performed under a multi-carrier status.

A multicarrier system or carrier aggregation system refers to a system that together aggregates a plurality of carriers having a bandwidth smaller than that of a target band to support a broadband. The carrier aggregation technology is different from the orthogonal frequency division multiplexing (OFDM) technology in that downlink or uplink communication is performed using a plurality of carrier frequencies. In the OFDM technology, downlink or uplink communication is performed by carrying a basic frequency band, which is divided into a plurality of subcarriers, in one carrier frequency. When a plurality of carriers having a bandwidth smaller than that of a target band are aggregated, for backward compatibility with the system according to the related art, a bandwidth of aggregated bands may be limited to a bandwidth used in the system of the related art. For example, the LTE system according to the related art supports bandwidths of 1.4, 3, 5, 10, 15 and 20 MHz, and the LTE-A system evolved from the LTE system may support a bandwidth greater than 20 MHz by using the bandwidths only supported by the LTE system. Alternatively, the LTE-A system may support carrier aggregation by defining a new bandwidth regardless of the bandwidth used in the system according to the related art. Multicarrier refers to a terminology that may be used together with carrier aggregation and bandwidth aggregation. Also, carrier aggregation refers to both contiguous carrier aggregation and non-contiguous carrier aggregation. For reference, if one component carrier (CC) is only used for communication in a TDD mode, or if one UL CC and one DL CC are only used for communication in a FDD mode, this communication corresponds to that performed under a single carrier situation (non-CA).

DISCLOSURE

Technical Problem

Under a multicarrier aggregation status where a plurality of carriers are aggregated and used for communication between a base station BS and a user equipment UE, a communication method based on a single carrier cannot be applied to communication based on multiple carriers. A new communication method, which is suitable for communication based on a plurality of carriers while minimizing an influence on the existing system, should be defined.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for transmitting, by a use equipment configured with a plurality of cells, an uplink signal to a base station, comprises: receiving information indicating a special secondary cell (SCell) for a random access procedure, among one or more SCells within an SCell group comprised of the one or more SCells, from the base station; performing the random access procedure on the special SCell; and transmitting an uplink signal for the one or more SCells within the SCell group to the base station on the special SCell through a PUCCH, wherein the SCell group is different from a PCell group which includes at least a primary cell (PCell) of the plurality of cells.

In another aspect of the present invention, a method for receiving, by a base station, an uplink signal from a user equipment configured with a plurality of cells, comprises: transmitting information indicating a special secondary cell (SCell) for a random access procedure, among one or more SCells within an SCell group comprised of the one or more SCells, to the user equipment; performing the random access procedure with the user equipment on the special SCell; and receiving an uplink signal for the one or more SCells within the SCell group from the user equipment on the special SCell through a PUCCH, wherein the SCell group is different from a PCell group, which includes at least a primary cell (PCell) of the plurality of cells.

In still another aspect of the present invention, a user equipment, which is configured with a plurality of cells, for transmitting an uplink signal to a base station, comprises: a radio frequency (RF) unit configured to transmit or receive a radio signal; and a processor configured to control the RF unit, wherein the processor controls the RF unit to receive information indicating a special secondary cell (SCell) for a random access procedure, among one or more SCells within an SCell group comprised of the one or more SCells, from the base station, controls the RF unit to perform the random access procedure on the special SCell, and controls the RF unit to transmit an uplink signal for the one or more SCells within the SCell group to the base station on the special SCell through a PUCCH, wherein the SCell group is different from a PCell group which includes at least a primary cell (PCell) of the plurality of cells.

In further still another aspect of the present invention, a base station for receiving an uplink signal from a user equipment configured with a plurality of cells, comprises: a radio frequency (RF) unit configured to transmit or receive a radio signal; and a processor configured to control the RF unit, wherein the processor controls the RF unit to transmit information indicating a special secondary cell (SCell) for a random access procedure, among one or more SCells within an SCell group comprised of the one or more SCells, to the user equipment, and controls the RF unit to perform the random access procedure with the user equipment on the special SCell, and controls the RF unit to receive an uplink signal for the one or more SCells within the SCell group from the user equipment on the special SCell through a PUCCH, wherein the SCell group is different from a PCell group which includes at least a primary cell (PCell) of the plurality of cells.

In each aspect of the present invention, a timing advance command (TAC) for the special SCell from the base station may be transmitted from the base station to the user equipment in response to the random access procedure performed on the special Scell, and the base station and the user equipment may apply the TAC to every cell within the SCell group.

In each aspect of the present invention, information indicating release of the special SCell may be transmitted from the base station to the user equipment, and the base station and the user equipment may release every cell within the SCell group in accordance with the information indicating release of the special SCell.

In each aspect of the present invention, information indicating deactivation of the special SCell may be transmitted from the base station to the user equipment, and the base station and the user equipment may deactivate every cell within the SCell group in accordance with the information indicating deactivation of the special SCell.

In each aspect of the present invention, a deactivation timer for the special SCell may be transmitted from the base station to the user equipment, and the base station and the user equipment may apply the deactivation timer to every cell within the SCell group.

In each aspect of the present invention, the base station and the user equipment may release or deactivate every cell within the SCell group in case of radio link failure for the special SCell.

The aspects of the present invention are only a part of the preferred embodiments of the present invention, and various embodiments based on technical features of the present invention may be devised and understood by the person with ordinary skill in the art based on the detailed description of the present invention.

Advantageous Effects

According to the present invention, uplink carriers where the user equipment UE and the base station BS are operated on different frequencies and/or uplink carriers where the user equipment UE and the base station BS are operated on frequencies, which use antennas of different locations, may be aggregated.

Also, according to the present invention, a plurality of time advances may be managed efficiently for one user equipment UE.

Also, according to the present invention, different time advances may be applied to uplink CCs having different frequency features.

It will be appreciated by persons skilled in the art that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 is a diagram illustrating an example of a PHR MAC control element (CE) format transmitted from a user equipment UE, which includes carrier aggregation, to a base station BS;

BEST MODE FOR CARRYING OUT THE INVENTION

Figure 1:
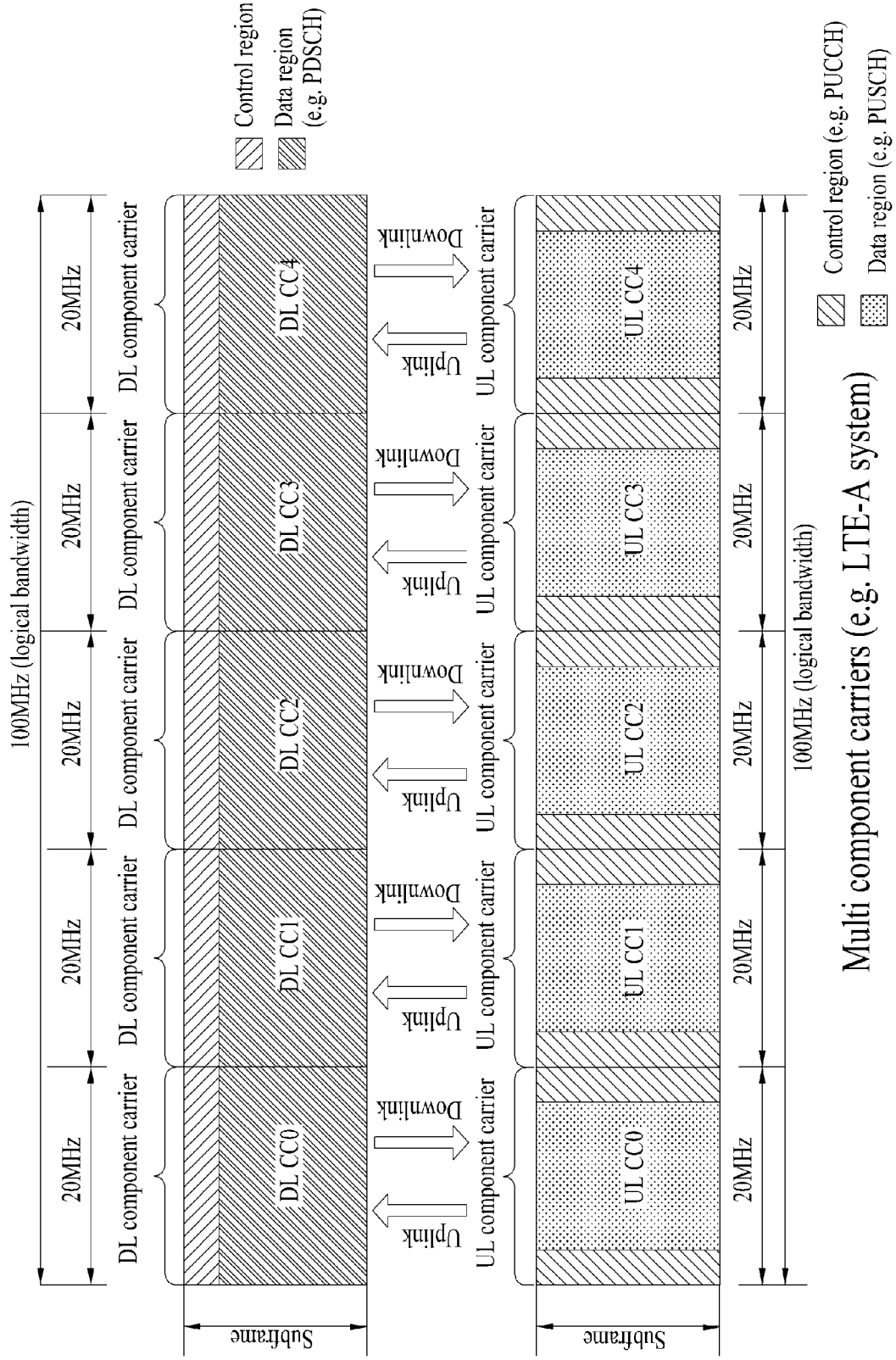
FIG. 1 is a diagram illustrating an example of communication performed under a multi-carrier status.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention have been described based on the data transmission and reception between a base station BS and a user equipment UE. In this case, the base station BS means a terminal node of a network, which performs direct communication with the user equipment UE. A specific operation which has been described as being performed by the base station may be performed by an upper node of the base station BS as the case may be. In other words, it will be apparent that various operations performed for communication with the user equipment UE in the network which includes a plurality of network nodes along with the base station may be performed by the base station BS or network nodes other than the base station BS. The base station BS may be replaced with terms such as a fixed station, Node B, eNode B (eNB), and an access point (AP). A relay node may be replaced with terms such as a relay node (RN) and a relay station (RS). Also, the user equipment UE may be replaced with terms such as a terminal, a mobile station (MS), a mobile subscriber station (MSS), and a subscriber station (SS).

In the present invention, a Physical Downlink Control Channel (PDCCH) and a Physical Downlink Shared Channel (PDSCH) are sets of time-frequency resources or resource element (REs), which carry Downlink Control Information (DCI) and downlink data, respectively. Also, a Physical Uplink Control Channel (PUCCH), a Physical Uplink Shared Channel (PUSCH), and a Physical Random Access Channel (PRACH) are sets of time-frequency resources or resource elements, which carry Uplink Control Information (UCI), uplink data, and a random access signal, respectively. In the present invention, if it is said that a user equipment UE transmits a PUCCH, a PUSCH and a PRACH, this may mean that the UE transmits UCI, uplink data and a random access signal on the PUCCH, the PUSCH and the PRACH, respectively. In addition, if it is said that a base station BS transmits a PDCCH and a PDSCH, this may mean that the base station BS transmits downlink data and control information on the PDCCH and the PDSCH, respectively.

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

Structure of LTE System

Figure 2:
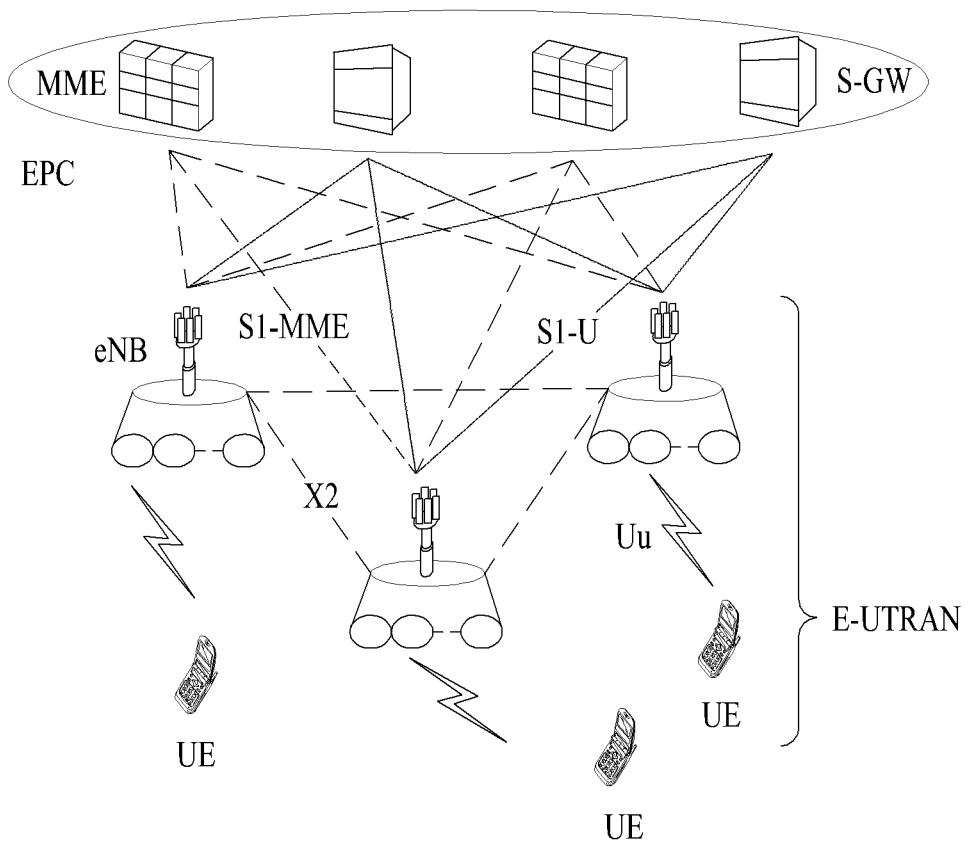
FIG. 2 is a diagram illustrating a structure of a wireless communication system.

FIG. 2 is a diagram illustrating a structure of a wireless communication system.

A system structure of the LTE system, which is an example of the wireless communication system to which the present invention may be applied, will be described with reference to FIG. 2. The LTE system is a mobile communication system evolved from the UMTS. As shown in FIG. 2, the LTE system may be divided into E-UTRAN (Evolved UMTS Terrestrial Radio Access Network) and EPC (Evolved Packet Core). The E-UTRAN includes a user equipment UE and eNB (Evolved NodeB, base station). An interface between the UE and the eNB may be referred to as Uu interface, and an interface between eNBs may be referred to as X2 interface. The EPC includes a mobility management entity (MME) and a serving-gateway (S-GW), wherein the MME serves as a control plane and the serving gateway serves as a user plane. An interface between the eNB and the MME may be referred to as S1-MME interface, and an interface between the eNB and the S-SG may be referred to as S1-U interface. The S1-MME interface and the S1-U interface may be referred to as S1 interface.

Figure 3:
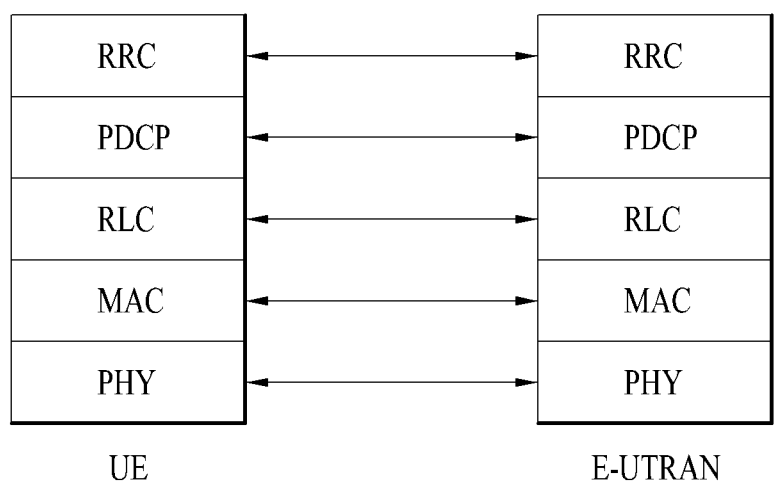
FIG. 3 and FIG. 4 are diagrams respectively illustrating a control plane and a user plane of a radio protocol.

A radio interface protocol is defined in the Uu interface which is a radio interval, and horizontally includes a physical layer, a data link layer, and a network layer, and vertically includes a user plane for data information transfer and a control plane for signaling transfer (control signal transfer). As shown in FIG. 2 and FIG. 3, the radio interface protocol may be classified into L1 (first layer) including a physical (PHY) layer, L2 (second layer) including MAC/RLC/PDCP (medium access control/radio link control/protocol data convergence protocol) layers, and L3 (third layer) including RRC layer, based on three lower layers of the open system interconnection (OSI) standard model widely known in the communications systems. These radio protocol layers exist in the user equipment UE and the E-UTRAN in pairs, and play a role in data transfer of the Uu interface.

Figure 4:
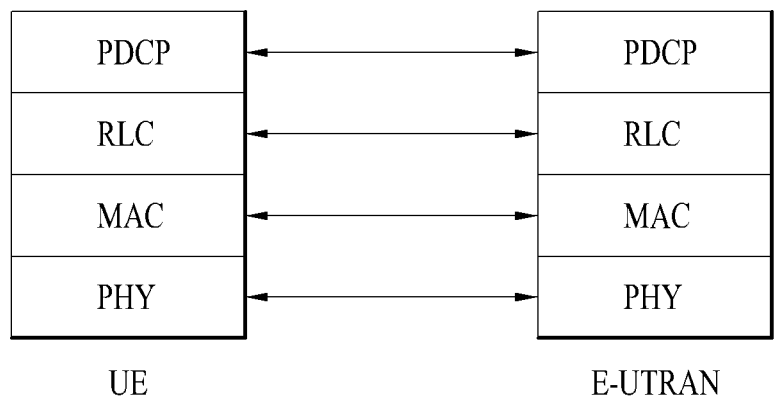

FIG. 3 and FIG. 4 are diagrams respectively illustrating a control plane and a user plane of a radio protocol.

Referring to FIG. 3 and FIG. 4, the physical (PHY) layer belonging to the first layer L1 provides an information transfer service using a physical channel. The PHY layer is connected to a medium access control (MAC) layer above the physical layer via a transport channel. Data are transferred between the medium access control layer and the physical layer via the transport channel. At this time, the transport channel is divided into a dedicated transport channel and a common transport channel depending channel sharing. Data are transferred between one physical layer of a transmitting side and the other physical layer of a receiving side through the physical channel.

Several layers exist in the second layer. First of all, the MAC layer serves to map various logical channels into various transport channels, and also serves as logical channel multiplexing for mapping several logical channels into one transport channel. The MAC layer is connected with a radio link control (RLC) layer through a logical channel, wherein the RLC layer is located above the MAC layer. The logical channel is divided into a control channel transmitting information of the control plane and a traffic channel transmitting information of the user plane depending on types of transmitted information.

The RLC layer of the second layer serves to perform segmentation and concatenation of data received from its upper layer to control a size of the data so that the lower layer transmits the data to a radio interval. Also, the RLC layer of the second layer provides three action modes, i.e., a transparent mode (TM), an un-acknowledged mode (UM), and an acknowledged mode (AM) to ensure various quality of services (QoS) required by each radio bearer (RB). In particular, the AM RLC layer performs a retransmission function through automatic repeat and request (ARQ) function for reliable data transmission.

In order to effectively transmit data using IP packets such as IPv4 or IPv6 within a radio-communication interval having a narrow bandwidth, a PDCP (packet data convergence protocol) layer of the second layer performs header compression to reduce the size of IP packet header having relatively great size and unnecessary control information. The header compression is to increase transmission efficiency of the radio-communication interval by allowing a packet header of data to transmit necessary information only. Also, in the LTE system, the PDCP layer performs a security function. The security function includes a ciphering function preventing the third party from performing data monitoring and an integrity protection function preventing the third party from performing data manipulation.

A radio resource control (RRC) layer located on the highest part of the third layer is defined in the control plane only and is associated with configuration, re-configuration and release of radio bearers (RBs) to be in charge of controlling the logical, transport and physical channels. In this case, the RB means a service or logical path provided by the first and second layers of the radio protocol for the data transfer between the user equipment and the UTRAN. Generally, establishing RB means that features of a radio protocol layer and channel required for a specific service are defined and their detailed parameters and action methods will be established. The RB is divided into a signaling RB (SRB) and a data RB (DRB). The SRB is used as a passageway for transmitting RRC message in the control plane, and the DRB is used as a passageway for transmitting user data in the user plane.

Carrier Aggregation Technology

Meanwhile, as described with reference to FIG. 1, the carrier aggregation or bandwidth aggregation technology has been recently discussed. For example, referring to FIG. 1, the carrier aggregation technology may support a system bandwidth of maximum 100 MHz by using five component carriers (CCs) of 20 MHz grouped on each of the uplink and the downlink. The respective CCs may adjoin each other or not in the frequency domain. Although FIG. 1 illustrates that a bandwidth of UL CC is the same as that of DL CC, bandwidths of the respective CCs may be defined independently. Also, asymmetric carrier aggregation where the number of UL CCs is different from the number of DL CCs may be performed. The UL CC and the DL CC may be referred to as UL resources and DL resources, respectively. Even though the base station BS controls X number of DL CCs, a frequency band that may be received by a specific user equipment may be limited to $Y(\leq X)$ number of DL CCs. In this case, the user equipment UE monitors DL signal and data transmitted through the Y number of CCs. Also, even though the base station BS controls L number UL CCs, a frequency band that may be transmitted from a specific user equipment UE may be limited to $M(\leq L)$ number of UL CCs. In this way, the DL/UL CC limited to the specific user equipment UE may be referred to as serving UL/DL CC configured by the specific UE.

CCs used for carrier aggregation may be classified into a primary component carrier (PCC) and secondary component carriers (SCC). The primary component carrier means a carrier used to exchange traffic and control signaling between the base station and the user equipment. Control signaling may include addition of component carriers, configuration for the primary component carrier, uplink (UL) grant, and downlink (DL) assignment. Although a plurality of component carriers (CCs) are used by the base station, the user equipment connected to the base station may be configured to have only one primary component carrier. If the user equipment is operated in a single carrier mode, the primary component carrier is used. According to single carrier communication, one PCC is used for communication between the user equipment UE and the base station BS, whereas SCC is not used for communication. Accordingly, all requirements required for exchange of data and control signaling between the base station and the user equipment should be fulfilled so that the primary component carrier may be used independently.

In the mean time, the secondary component carrier means an additional component carrier that may be configured after RRC connection is established between the user equipment UE and the base station BS. The SCC may form a set of serving CCs for the UE together with the PCC according to capability of the UE. The SCC may be activated or deactivated depending on data requirements transmitted and received. The SCC may be configured to be used only by a specific command and rule received from the base station. Also, the SCC may be configured to be used together with the PCC to support additional bandwidth. Control information such as uplink grant or downlink assignment may be received from the base station to the user equipment through a PDCCH or PDSCH of the activated SCC, and uplink control information such as channel state information (for example, a channel quality indicator (CQI), a precoding matrix index (PMI), and a rank indicator (RI)) be transmitted from the user equipment to the base station through a PUCCH.

In the meantime, the 3GPP LTE(-A) system uses a concept of cell to manage radio resources. In view of the radio resources, the cell is defined by combination of downlink resources and uplink resources, that is, combination of DL CC and UL CC. The cell may be configured by downlink (DL) resources only, or may be configured by combination of downlink resources and uplink resources. If carrier aggregation is supported, linkage between carrier frequency of the downlink resources (or DL CC) and carrier frequency of the uplink resources (or UL CC) may be indicated by system information. For example, combination of DL resources and UL resources may be indicated by system information block type2 (SIB2) linkage. In case of the FDD, since UL operating band is different from UL operating band, different carrier frequencies are linked to constitute one cell, and the SIB2 linkage indicates a frequency different from that of DL CC accessed by the UE as the frequency of the UL CC. In other words, in case of the FDD, the DL CC and the UL CC linked with the DL CC to constitute one cell are operated at their respective frequencies different from each other. In case of the TDD, since the UL operating band is the same as the DL operating band, one carrier frequency constitutes one cell, and the SIB2 linkage indicates the same frequency as that of the DL CC accessed by the UE as the frequency of the corresponding UL CC. In other words, in case of the TDD, the DL CC and the UL CC linked with the DL CC to constitute one cell are operated at the same frequency. In this case, the carrier frequency means a center frequency of each cell or CC. Hereinafter, the cell operated on the primary frequency will be referred to as a primary cell (PCell) or PCC, and the cell operated on the secondary frequency (or SCC) will be referred to as a secondary cell (SCell) or SCC.

For reference, the terminology 'cell' used in carrier aggregation is different from the terminology 'cell' indicating a certain geographical area where a communication service is provided by one antenna group. In order to identify the cell indicating a certain geographical area from the cell of carrier aggregation, the cell of carrier aggregation will be referred to as CC and the cell of the geographical area will be referred to as a cell in the following embodiments of the present invention.

Resource allocation to the user equipment may be performed in the range of a primary component carrier or one or more PCCs. If carrier aggregation is configured, the system may allocate the SCC to the user equipment asymmetrically to the downlink and/or the uplink, on the basis of system load (that is, static/dynamic load balancing), peak data rate, or service quality request. In use of the carrier aggregation technology, configuration for the component carriers is provided from the base station to the user equipment after RRC connection procedure. RRC connection means that the user equipment is allocated with a radio resource on the basis of RRC signaling exchanged between the RRC layer of the user equipment and a network through SRB. After RRC connection procedure of the user equipment and the base station is performed, the user equipment may receive configuration information on the primary component carrier and/or the secondary component carrier(s) from the base station. The configuration information on the secondary component carriers may include addition/release (or activation/deactivation) of the secondary component carriers. Accordingly, in order to activate the secondary component carriers between the base station and the user equipment or deactivate the existing secondary component carriers, exchange of RRC signaling and MAC control elements is required. Activation or deactivation of the secondary component carriers may be determined by the base station on the basis of quality of service (QoS), load condition of carriers, and the other factors. The base station may command the user equipment to configure the secondary component carriers by using a control message that includes information such as command type (activation/deactivation) on the downlink/uplink and a list of secondary component carriers. However, once the primary component carrier is allocated to the user equipment UE, it is not deactivated if CC allocation for the user equipment UE is reconfigured or unless the user equipment UE performs handover.

Uplink/Downlink L2 Structure Considering Carrier Aggregation

Figure 5:
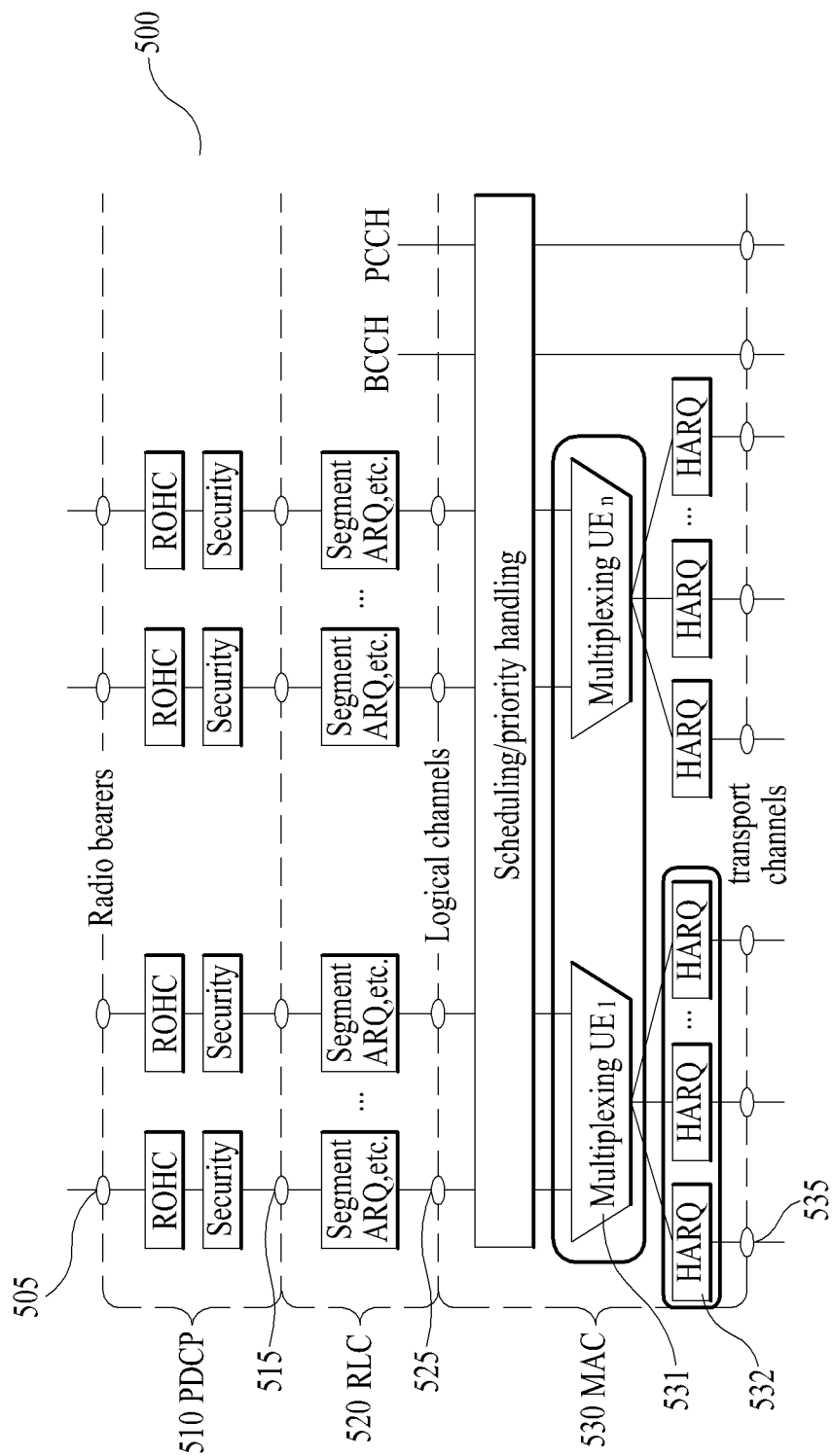
FIG. 5 is a diagram illustrating a structure of a downlink L2 (second layer) in carrier aggregation.
Figure 6:
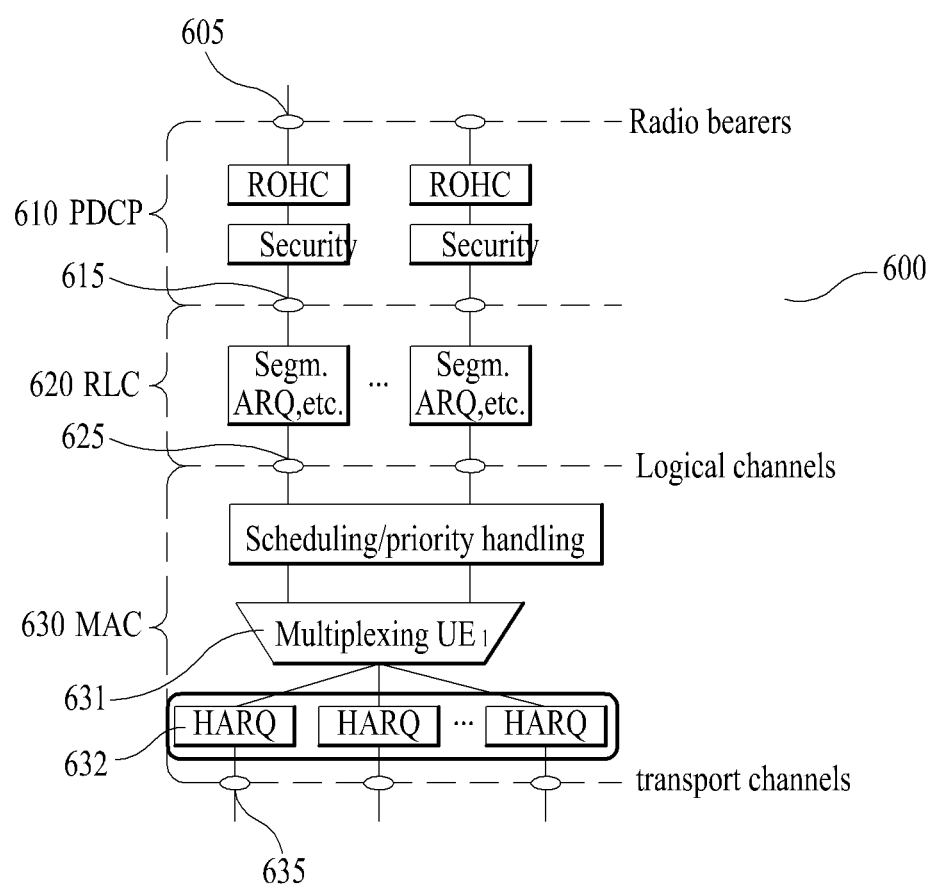
FIG. 6 is a diagram illustrating a structure of an uplink L2 (second layer) in carrier aggregation.

FIG. 5 is a diagram illustrating a structure of a downlink L2 (second layer) in carrier aggregation, and FIG. 6 is a diagram illustrating a structure of an uplink L2 (second layer) in carrier aggregation. A structure of L2 (second layer) considering carrier aggregation technology will be described with reference to FIG. 5 and FIG. 6.

In a downlink L2 structure 500 of FIG. 5, a PDCP layer 510, an RLC layer 520 and a MAC layer 530 are shown. In FIG. 5, elements 505, 515, 525 and 535 marked with circles in an interface between the respective layers represent service access points (SAP) for peer-to-peer communication. The SAP between a PHY channel (not shown) and the MAC layer provides a transport channel (535), and the SAP between the MAC layer and the RLC layer provides a logical channel (525). A general operation of each layer has been described above.

The MAC layer multiplexes a plurality of logical channels (that is, radio bearers) from the RLC layer. In the downlink L2 structure, a plurality of multiplexing entities 531 of the MAC layer are related to application of the multiple input multiple output (MIMO) technology. In a system that does not consider the carrier aggregation technology, since one transport channel is generated by multiplexing a plurality of logical channels in case of non-MIMO, one hybrid automatic repeat and request (HARQ) entity is provided to one multiplexing entity (not shown).

In the meantime, in a system that considers the carrier aggregation technology, a plurality of transport channels corresponding to a plurality of CCs are generated from one multiplexing entity 531. In this regard, in the carrier aggregation technology, one HARQ entity 532 manages one CC. Accordingly, the MAC layer 530 of the system that supports the carrier aggregation technology provides a plurality of HARQ entities 532 to one multiplexing entity 531. Also, since the respective HARQ entities 532 process a transport block independently, they may transmit and receive a plurality transport blocks through a plurality of CCs at the same time.

In an uplink structure 600 of FIG. 6, the same operation as that of the downlink L2 structure 500 of FIG. 5 is performed except that one multiplexing entity 630 is included in one MAC layer 630. In other words, a plurality of HARQ entities 632 are provided for a plurality of CCs, the operations related to the plurality of HARQ entities 632 are performed by the MAC layer 630, and the plurality of transport blocks are transmitted and received through the plurality of CCs at the same time.

Uplink Time Advance Maintenance

In the 3GPP LTE(-A) system based on the orthogonal frequency division multiplex (OFDM) technology, the time required for a signal transmitted from the user equipment UE to reach the base station BS may be varied depending on a radius of the cell, a location of the user equipment UE within the cell, and a moving speed of the user equipment UE. In other words, if the base station BS does not manage transmission timing per user equipment UE, a transport signal of a specific user equipment UE may interfere with a transport signal transmitted from another user equipment UE, whereby an error rate of a received signal is increased at the base station BS. In more detail, in case of the user equipment UE that tries to transmit a signal at the cell edge, the time required for the transmitted signal to reach the base station BS is longer than the time required for the transport signal of the user equipment UE located at the center of the cell to reach the base station BS. On other hand, the time required for the transport signal of the user equipment UE located at the center of the cell to reach the base station BS will relatively be shorter than the time required for the transport signal of the user equipment UE located at the cell edge to reach the base station BS. In view of the base station BS, in order to avoid interference, since data or signals transmitted from all the UEs within the cell should be received within every effective time boundary, the base station BS should appropriately control transmission timing of the user equipment UE in accordance with the status of the user equipment UE. This control will be referred to as time advance maintenance or time alignment maintenance.

As one method for manage uplink time alignment, a random access procedure may be provided. In other words, the base station BS receives a random access preamble from the user equipment UE through the random access procedure, and calculates a time advance value for making transmission timing of the user equipment UE fast or slow, by using received information of the random access preamble. And, the base station BS notifies the user equipment UE of the calculated time advance value through a random access response, and the user equipment UE updates transmission timing by using the value. As another method for manage uplink time alignment, a method based on a sounding reference signal (SRS) may be provided. The base station BS receives the SRS from the user equipment UE periodically or randomly, calculates a time advance value of the user equipment UE through the received signal, and notifies the user equipment UE of the calculated time advance value through the received signal. As a result, the user equipment UE updates its transmission timing.

As described above, the base station BS measures the transmission timing of the user equipment UE by using the random access preamble or the SRS, calculates a timing value for correction, and notifies the user equipment UE of the calculated timing value. The time advance value (that is, timing value for correction) transmitted from the base station BS to the user equipment UE will be referred to as a timing advance command. The timing advance command is processed by the MAC layer. Since the user equipment UE does not always exist at a fixed location, the transmission timing of the user equipment UE is varied every time depending on the moving speed of the user equipment UE, the location of the user equipment UE, etc. Considering this, it is assumed that the timing advance command is valid for a specific time period not an infinite time if the user equipment UE receives the timing advance command from the base station BS. In order to count the specific time assuming that the timing advance command is valid, the user equipment UE uses a time alignment timer. If the user equipment UE receives the timing advance command from the base station BS, the user equipment UE initiates the time alignment timer. It is assumed that the uplink time advance of the user equipment UE is synchronized with the uplink time advance of the base station BS, i.e., the uplink time is aligned only when the time alignment timer is operating. A value of the time alignment timer may be transferred from the base station BS to the user equipment UE through RRC signal such as system information or radio bearer reconfiguration. Also, if the user equipment UE receives a new timing advance command from the base station BS while the time alignment timer is operating, the user equipment UE resets the time alignment timer. If the time alignment timer expires, or if the time alignment timer is not operating, the user equipment UE assumes that its time advance is not synchronized with the time advance of the base station BS, and does not transmit any uplink signal, for example, a physical uplink shared channel (PUSCH) and a physical uplink control channel (PUCCH), except for the random access preamble.

Radio Link Monitoring

In the present invention, communication of the user equipment UE with a specific cell means that the user equipment UE performs communication with the base station BS, antenna or antenna group, which provides a communication service to the specific cell. Also, a downlink or uplink signal of the specific cell means a downlink or uplink signal received by or transmitted from the user equipment UE from or to the base station BS, antenna or antenna group, which provides a communication service to the specific cell. Channel status/quality of the specific cell means channel status/quality of a channel or communication link formed between the base station BS, antenna or antenna group and a predetermined UE.

The user equipment UE continues to perform measurement to maintain communication link quality with the cell that provides a service to the user equipment UE. In particular, the user equipment UE determines whether the communication link quality with the cell that provides a service thereto is in available communication status or not. If the user equipment UE determines that quality of the cell is not good to perform communication, the user equipment UE declares radio link failure (RLF). If the user equipment UE declares radio link failure, the user equipment UE does not maintain communication with the corresponding cell, selects a cell through a cell selection procedure, and then tries RRC connection re-establishment.

Figure 7:
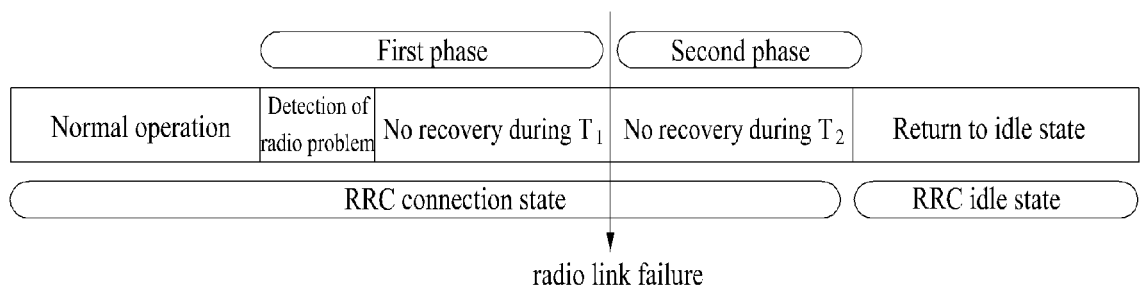
FIG. 7 is a diagram illustrating an operation of a user equipment UE, which is associated with radio link failure.

FIG. 7 is a diagram illustrating an operation of a UE, which is associated with radio link failure. Referring to FIG. 7, the operation of the user equipment UE, which is related to radio link failure, may be described as two phases as follows.

At the first phase, the user equipment UE tests whether there is any problem in a current radio communication link. If there is a problem in the radio link, the user equipment UE declares radio link failure and waits for a certain time period T1 whether the communication link is recovered. If the corresponding link is recovered for the time period T1, the user equipment UE continues to perform normal operation. If the radio link problem detected at the first phase is not solved for the time period T1, the user equipment UE declares radio link failure and enters the second phase. At the second phase, for recovery from the radio link failure, the user equipment UE performs RRC connection re-establishment procedure. The RRC connection re-establishment procedure is that RRC connection is re-established in the RRC connection state (RRC_CONNECTED). Since the user equipment UE stays in the RRC connection state (RRC_CONNECTED), that is, the user equipment UE does not enter the RRC idle state (RRC_IDLE), the user equipment UE does not reset all of its radio configurations (for example, radio bearer configurations). Instead, the user equipment UE temporarily suspends use of all the radio bearers except for SRB0 when starting the RRC connection re-establishment procedure. If the RRC connection re-establishment is performed successfully, the user equipment UE resumes use of the radio bearers of which use is temporarily suspended. However, if the user equipment UE does not complete RRC connection re-establishment for a certain time period T2, the user equipment UE enters the RRC idle state.

Figure 8:
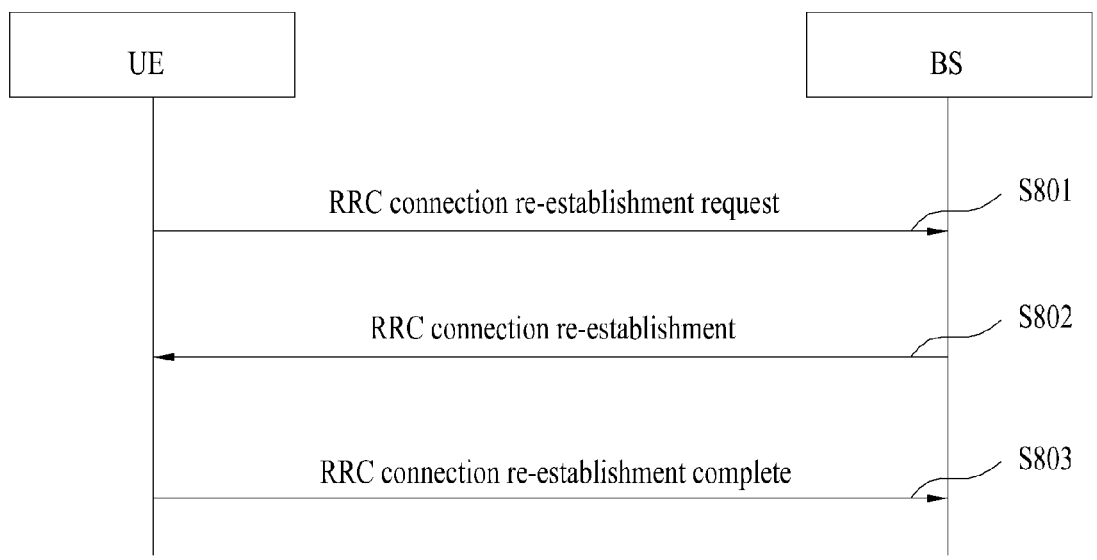
FIG. 8 and FIG. 9 are diagrams illustrating an operation of a user equipment UE in an RRC connection reestablishment procedure.
Figure 9:
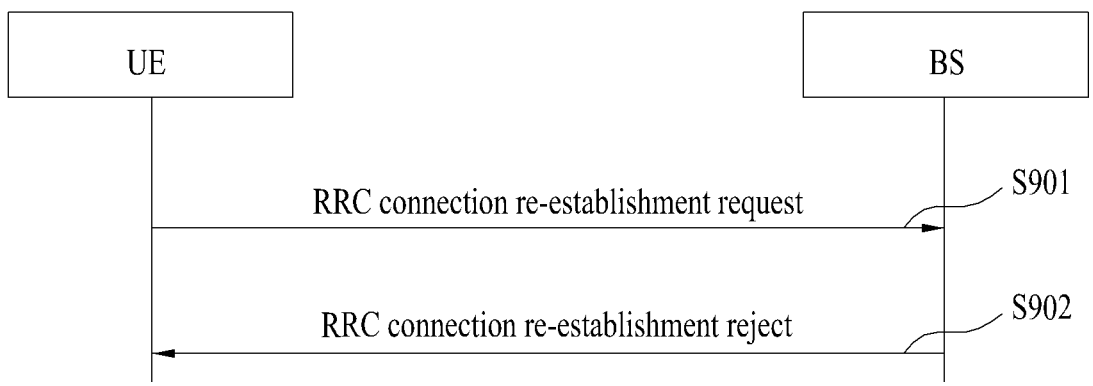

FIG. 8 and FIG. 9 are diagrams illustrating an operation of UE in an RRC connection re-establishment procedure. The RRC connection re-establishment procedure is performed to re-establish RRC connection involved in resume of SRB2 operation, re-activation of security, and configuration of PCC only. The user equipment UE of which security is activated and which is in RRC connection state may initiate the RRC connection re-establishment procedure to continue to perform RRC connection.

The operation of the user equipment UE in the RRC connection re-establishment procedure will be described in more detail with reference to FIG. 8 and FIG. 9. First of all, the user equipment UE selects one cell by performing cell selection. The user equipment UE receives system information from the selected cell to receive basic parameters for access to the cell.

Subsequently, the user equipment UE tries RRC connection re-establishment through the random access procedure. The user equipment UE, which has received random access response, transmits an RRC connection re-establishment request message RRCConnectionReestablishmentRequest to the base station BS to re-establish RRC connection (S801). If the base station BS of the cell selected by the user equipment UE through RRC cell selection has a context of the user equipment UE, that is, if the selected cell is a prepared cell, the base station BS of the corresponding cell may accept RRC connection re-establishment request by transmitting an RRC connection re-establishment message RRCConnectionReestablishment to the user equipment UE (S802). If the base station BS accepts re-establishment, the operation of the other radio bearers is maintained in a stopped state, but SRB1 operation is resumed. The user equipment UE, which has received the RRC connection re-establishment message, may re-establish RRC connection and transmit an RRC connection re-establishment complete message RRCConnectionReestablishmentComplete to the base station BS. As a result, RRC connection re-establishment may be performed successfully. However, if the cell selected by the user equipment UE is not a prepared cell, since the base station BS of the corresponding cell does not have a context of the user equipment UE, even though the base station BS receives the RRC connection re-establishment request message from the user equipment UE (S901), it cannot accept the RRC connection re-establishment request of the user equipment UE. Accordingly, the base station BS transmits an RRC connection re-establishment reject message RRCConnectionReestablishmentReject to the user equipment UE (S902). As a result, the RRC connection re-establishment procedure is failed.

Random Access Procedure

Hereinafter, a random access procedure performed by the 3GPP LTE system will be described in more detail.

In the 3GPP LTE system, the user equipment UE may perform the random access procedure in case of the following cases.

Case where the user equipment UE performs initial access due to no RRC connection with the base station BS.

Case where the user equipment UE initially accesses a target cell during a handover procedure.

Case where the random access procedure is requested by a command of the base station BS.

Case where uplink data occur in a state that uplink time advance is not synchronized or a designated radio resource is not allocated.

Case where a recovery procedure is performed during radio link failure or handover failure.

A random access preamble is used for the random access procedure. The random access procedures are classified into a contention based random access procedure and a non-contention based random access procedure in accordance with a procedure of selecting a random access preamble. In the contention based random access procedure, the user equipment UE randomly selects one of a set of random access preambles and uses the selected one. In the non-contention based random access procedure, a specific UE uses a random access preamble allocated thereto from the base station BS. The contention based random access procedure is different from the non-contention based random access procedure in occurrence of contention. The non-contention based random access procedure may be used only in case of request based on the handover procedure or the command of the base station BS.

Figure 10:
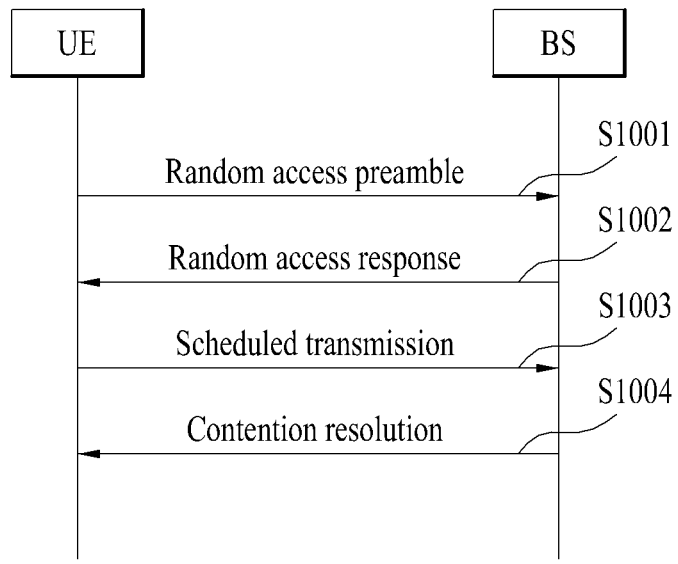
FIG. 10 is a diagram illustrating an operation procedure of a user equipment UE and a base station BS in a contention based random access procedure.

FIG. 10 is a diagram illustrating an operation procedure of UE and BS in a contention based random access procedure.

1. Random Access Preamble

In case of contention based random access, the user equipment UE may randomly select one random access preamble from a set of random access preambles indicated through system information or handover command, and may select a physical random access channel (PRACH), through which the random access preamble may be transmitted and transmit the selected one (S1001).

2. Random Access Response

After transmitting the random access preamble, the user equipment UE tries to receive its random access response within a random access receiving window indicated by the base station BS through the system information or handover command (S1002). In more detail, the random access response information may be transmitted in the form of MAC PDU (packet data unit). The MAC PDU may be transferred through a physical downlink shared channel (PDSCH). Also, in order to appropriately receive the information through the PDSCH, the user equipment UE may monitor a physical downlink control channel (PDCCH). The PDCCH may include information of the user equipment UE, which should receive the PDSCH, frequency and time information of a radio resource of the PDSCH, and a transmission format of the PDSCH. Once the user equipment UE receives the PDCCH successfully, it may appropriately receive the random access response transmitted to the PDSCH in accordance with the information of the PDCCH. The random access response may include a random access preamble identifier (ID) (RAPID), uplink (UL) grant indicating uplink radio resources, a temporary cell radio network temporary identifier (C-RNTI) (hereinafter, referred to as temporary cell identifier) and a time advance correction value (for example, timing advance command (TAC)). Since random access responses for one or more user equipments UEs may be included in one random access response timing, the random access preamble identifier is required for random access response to indicate a user equipment UE for which the UL grant, the temporary cell identifier and the TAC are effective. The user equipment UE may receive the UL grant, the temporary cell identifier and TAC by selecting a random access response having a random access preamble identifier identical with the random access preamble selected by itself (S1001).

3. Scheduled Transmission

If the user equipment UE receives a random access response effective for itself, it respectively processes various kinds of the information included in the random access preamble. Also, the user equipment UE transmits data stored in the buffer or newly generated data to the base station BS based on the UL grant (S1003). At this time, the data based on the UL grant should include the identifier of the user equipment UE. In case of the content based random access procedure, the base station BS cannot determine which user equipment(s) UE(s) performs the random access procedure because the base station BS should identify the user equipment UE to solve contention later. There are two methods of including the identifier of the user equipment UE in data transmitted to the base station BS in response to the UL grant. The first method is that the user equipment UE having a valid cell identifier allocated from a corresponding cell before the random access procedure transmits its cell identifier through an uplink transmission signal corresponding to the UL grant. On the other hand, the user equipment UE which is not allocated with a valid cell identifier before the random access procedure transmits its unique identifier (for example, S-TMSI or random ID). Generally, the unique identifier is longer than the cell identifier. The user equipment UE which has transmitted the data corresponding to the UL grant initiates a contention resolution timer (hereinafter, referred to as "CR timer").

4. Contention Resolution

The user equipment which has transmitted the data including its identifier to the base station BS in response to the UL grant included in the random access response waits for a command of the base station BS to resolve contention. In other words, the user equipment UE tries to receive the PDCCH to receive a specific message from the base station BS (S1004). Two methods of receiving the PDCCH exist. As described above, if the identifier of the user equipment UE, which is transmitted in response to the UL grant, is the cell identifier, the user equipment UE tries to receive the PDCCH by using its cell identifier. If the identifier of the user equipment UE, which is transmitted in response to the UL grant, is the unique identifier, the user equipment UE may try to receive the PDCCH by using the temporary cell identifier included in the random access response. Afterwards, in case of the former case, if the PDCCH is received through the cell identifier of the user equipment UE before the CR timer expires, the user equipment UE determines that the random access procedure has been performed normally, and ends the random access procedure. In case of the latter case, if the PDCCH is received through the temporary cell identifier before the CR timer expires, the user equipment UE identifies the data carried by the PDSCH indicated by the PDCCH. If the unique identifier of the user equipment UE is included in the data carried by the PDSCH, the user equipment UE determines that the random access procedure has been performed normally, and ends the random access procedure.

Figure 11:
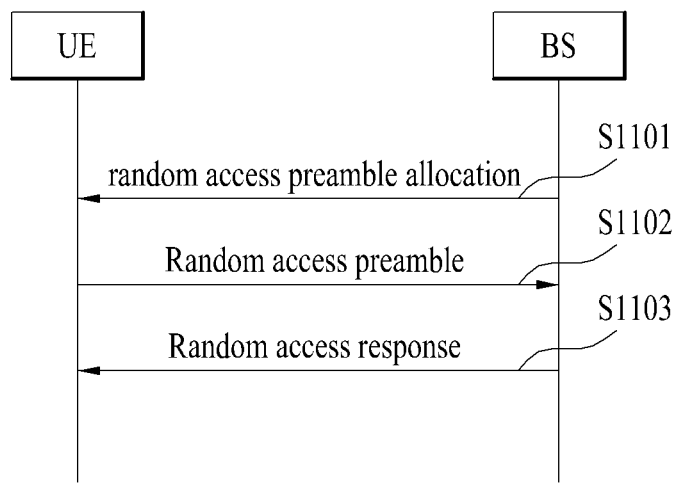
FIG. 11 is a diagram illustrating an operation procedure of a user equipment UE and a base station BS in a non-contention based random access procedure.

FIG. 11 is a diagram illustrating an operation procedure of UE and BS in a non-contention based random access procedure.

Unlike the contention based random access procedure shown in FIG. 10, the user UE determines that the random access procedure has been performed normally by receiving the random access response, and ends the random access procedure.

1. Random Access Preamble Allocation

As described above, the non-contention based random access procedure may be performed in case of a handover procedure or a request according to the command of the base station BS. Of course, the contention based random access procedure may be performed in case of these two cases.

First of all, for the non-contention based random access procedure, the user equipment UE is allocated with a dedicated random access preamble having no possibility of contention from the base station BS (S1101). The user equipment UE may be commanded the random access preamble from the base station BS through a handover command or a PDCCH order.

2. Random Access Preamble

The user equipment UE transmits its dedicated random access preamble allocated by the base station BS to the base station BS (S1102).

3. Random Access Response

The user equipment UE receives the random access response from the base station BS (S1103). The method of receiving the random access response from the base station BS is the same as that in the contention based random access procedure.

Activation/Deactivation of Serving CC

In configuration of carrier aggregation, the base station BS may configure a plurality of serving CCs for the user equipment UE. The base station BS may identify that some of the plurality of serving CCs may not be required for communication with the user equipment UE in accordance with traffic features of services used by the user equipment UE and radio channel quality of each serving CC. In the meantime, regardless of transmission and reception of the actual data between the user equipment UE and the base station BS, if the user equipment UE performs a measurement procedure of a radio channel and monitoring of a control signal for data transmission and reception for all the serving CCs included therein, battery consumption of the user equipment UE is increased. Accordingly, the base station BS may activate the serving CC(s), which is(are) used actually, among the plurality of serving CCs configured for the user equipment UE, and may deactivate the serving CC(s) which is (are) not used. The user equipment may reduce its battery consumption by not performing measurement of the radio channel and monitoring of the control signal for the deactivated serving CC(s).

The base station BS may transfer an activation or deactivation command for the serving CC to the user equipment UE through the MAC signal. The user equipment UE may deactivate the serving CC by using a specific timer (hereinafter, referred to as deactivation timer). If the user equipment UE receives the activation command for the specific serving CC from the base station, BS, it activates the specific serving CC and initiates the deactivation timer. If the deactivation timer expires, the user equipment UE deactivates the specific serving CC. If the user equipment receives the PDCCH indicating valid uplink grant or downlink assignment for the specific serving CC from the base station BS, it may reset the deactivation timer of the specific serving CC. The base station may command the user equipment UE to deactivate the corresponding serving CC through the MAC signal before the deactivation timer of the activated serving CC expires.

Maximum UE Output ($P_{CMAX}$)

The user equipment UE, which is configured with a plurality of CCs through carrier aggregation, may report power headroom (PH) to the base station BS as follows. In order to report the power headroom, the user equipment UE may perform the following operations.

The user equipment UE reports the power headroom PH for each serving CC to the base station BS.

In calculating the power headroom PH for each serving CC, the user equipment UE calculates a maximum output $P_{CMAX,c}$ for the corresponding CC, and calculates the other output value excluding the output value currently used in the corresponding CC from the maximum output $P_{CMAX,c}$ as the power headroom PH.

The maximum output $P_{CMAX,c}$ of the user equipment UE for the serving CC corresponds to the value excluding a power reduction value applied by the user equipment UE within a maximum power reduction (MPR) value in accordance with implementation of the user equipment UE.

In calculating the maximum output $P_{CMAX,c}$, since different values may be applied to each user equipment UE in accordance with implementation of the user equipment UE within the MPR value, for more exact power headroom report (PHR) to the base station BS, the user equipment UE transmits the PHR, which additionally includes the maximum output $P_{CMAX,c}$ excluding the power reduction value, to the base station BS.

FIG. 12 is a diagram illustrating an example of a PHR MAC control element (CE) format transmitted from a user equipment UE, which includes carrier aggregation, to a base station BS.

In FIG. 12, a "$C_i$" field indicates the presence of a PH filed for the SCC having SCC (that is, SCell) index i. The "$C_i$" field set to 1 may indicate that the PH for the corresponding SCC is reported, and the "$C_i$" field set to 0 may indicate that the PH for the corresponding SCC is not reported. "R" is a reserved bit and is set to 0. Also, a "V" field indicates whether the PH value is based on a real transmission or a reference format. If V=0, it indicates a real transmission on the PUSCH/PUCCH. If V=1, it indicates that a PUSCH or PUCCH reference format is used. Moreover, V=0 indicates the presence of an associated $P_{CMAX,c}$ field. If V=1, it indicates that the associated $P_{CMAX,c}$ field is omitted. A "PH" field indicates a power headroom level, and a "P" field indicates whether the user equipment UE applies power backoff due to power management. If the $P_{CMAX,c}$ field exists, this field indicates a maximum output used to calculate the preceding PH field.

In performing, by the user equipment UE configured with carrier aggregation, the aforementioned time advance maintenance, the simplest method is that the UE manages only one uplink time advance. In order that the base station BS and the user equipment UE manage the one uplink time advance, aggregated uplink CCs should be limited to the frequencies within the same frequency band. Also, if the same frequency is transmitted and received through antennas of different locations, since the distance between the antenna, which transmits and receives the frequency, and the user equipment UE is varied depending on the antennas, the same time advance cannot be applied to the uplink CCs operated at the frequency based on the antennas of different locations. Accordingly, in order to allow one uplink time advance maintenance, it is required that the aggregated uplink CCs should be operated on the frequency (or frequencies) based on the antennas of the same location as well as the frequencies within the same frequency band. If the uplink CCs, which belong to the same frequency band and are operated on the frequencies based on the antennas of the same location, are aggregated, the uplink CCs have the same or like frequency features or uplink timing features as one another, one uplink time advance maintenance may be performed.

If the user equipment UE manages one uplink time advance, it only has to manage one time alignment timer, and may determine that the aggregated uplink CCs are synchronized with one another in time advance while the time alignment timer is being driven. If the user equipment UE manages one uplink time advance, since the user equipment UE only has to acquire one TAC during the random access procedure, it performs the random access procedure through the PCC only. Namely, the user equipment UE does not perform the random access procedure through the SCC. Also, since all the uplink CCs have one time advance, the PUCCH is transmitted and received on the PCC only. Namely, the PUCCH is not transmitted/received on the SCC. Also, the user equipment UE performs radio link monitoring for the PCC only, and determines radio link failure for the PCC only. If radio link failure for the PCC is determined, the user equipment UE releases configuration of all the serving CC(s) configured for the user equipment UE and enters the RRC idle state RRC_IDLE. Accordingly, the user equipment UE, which manages time advance, does not enter the RRC idle state even though a problem occurs in a radio link of the SCC.

However, restrictions that the aggregated uplink CCs use the frequencies belonging to the same frequency band and the frequencies based on the antennas of the same location act as frequency management restrictions of operators. Accordingly, the technology of aggregating the uplink CCs operated on the frequencies within different frequency bands and/or the uplink CCs operated on the frequencies based on the antennas of different locations has been requested. In order that the uplink CCs operated on the frequencies within different frequency bands and/or the uplink CCs operated on the frequencies based on the antennas of different locations are aggregated, the user equipment UE should manage a plurality of time advances for the aggregated uplink CCs. In other words, the user equipment UE should manage a plurality of time alignment timers.

If the uplink CCs operated on the frequencies within different frequency bands and/or the uplink CCs operated on the frequencies based on the antennas of different locations are aggregated, the uplink CCs have different time advances in accordance with frequency features or uplink timing features. In order to support a plurality of uplink advances, according to the present invention, the uplink CCs are grouped (hereinafter, time advance group) in accordance with frequency features or uplink timing features, and the time alignment timer is managed per time advance group. In order that the user equipment UE manages the time alignment timer per time advance group, the user equipment UE should receive at least one TAC per time advance from the base station BS. Hereinafter, the time advance group, which includes the PCC, will be referred to as a PCC group, and the time advance group, which includes only the SCC(s) without PCC, will be referred to as an SCC group. One user equipment, which is configured with carrier aggregation, may have at least one PCC group. If SCC(s) having time advance different from that of the PCC exists, the user equipment UE may have one or more SCC time advance groups together with the PCC group. The PCC group may include at least PCC, and may include SCC or not. Each of the SCC time advance groups may include one or more SCCs.

In order that the user equipment UE manages the time alignment timer per time advance group, according to the present invention, the user equipment UE should perform the random access procedure in each time advance group. Accordingly, the user equipment UE of the present invention performs the random access procedure even on the SCC as well as the PCC. The present invention suggests that the base station BS configures a specific SCC (hereinafter, referred to as specific SCC) for which the user equipment UE performs the random access procedure, among the SCC(s) included in the SCC time advance group. Hereinafter, the SCC for which the user equipment UE performs the random access procedure will be referred to as a special SCC, and a method for managing the special SCC in the user equipment UE and the base station BS will be suggested. The SCC(s) having the same time advance as that of the special SCC may configure one SCC group together with the special SCC. According to the existing carrier aggregation system, although the steps S1001 to S1003 of the contention based random access procedure in FIG. 10 occur on the PCC only, while according to the present invention, steps S1001 to S1003 of the contention based random access procedure of FIG. 10 may occur on the special SCC as well as the PCC. Also, according to the existing carrier aggregation system, although the steps S1101 to S1103 of the non-contention based random access procedure in FIG. 11 occur on the PCC only, whereas according to the present invention, steps S1101 to S1103 of the non-contention based random access procedure of FIG. 11 may occur on the special SCC as well as the PCC.

The SCC(s) that uses the same time advance as that of the PCC may be included in the PCC group. The SCC(s) that uses the same time advance as that of the special SCC may be included in the SCC group to which the special SCC belongs. Preferably, one SCC group includes only one special SCC. The user equipment UE of the present invention may perform the random access procedure through the PCC and the special SCC(s) only. To this end, the base station BS of the present invention configures related parameter(s) to allow the user equipment UE to perform the random access procedure on the special SCC.

The present invention suggests an embodiment that the base station BS indicates to the user equipment UE through the RRC signal whether the corresponding SCC is the special SCC or a normal SCC, when adding the SCC as the serving CC for the user equipment UE. Alternatively, the base station BS may transmit information indicating the special SCC among the SCCs configured in the user equipment UE, to the user equipment UE. The base station BS may indicate to the user equipment UE whether normal SCC(s), not the special SCC(s), belong(s) to the PCC group or the SCC group. If the normal SCC belongs to the SCC group, the base station BS may indicate, to the user equipment UE, an SCC group to which the normal SCC belongs.

Unlike the existing wireless system where the same time advance is applied to all the uplink CCs, according to the present invention, different time advances are applied to different time advance groups. Accordingly, if the PUCCH for all the serving CCs is transmitted on the PCC only, the base station BS may not acquire channel state information (CSI), HARQ feedback and scheduling request information, which are related to the serving CC(s) which does(do) not belong to the PCC group. Accordingly, the present invention suggests an embodiment that the PUCCH for the SCC(s) belonging to the SCC group is transmitted and received on the special SCC of the SCC group. In other words, according to the present invention, the PCC is used for transmission(s) of PUCCH for the PCC group only, whereas the SCC set as the special SCC is used for PUCCH transmission for the SCC group to which the special SCC belongs. In order that the user equipment UE may perform PUCCH transmission on the special SCC, the base station BS may set the PUCCH resource to the user equipment UE by using the RRC signal. Accordingly, the user equipment UE transmits the uplink control information associated with the serving CC(s), which belongs (or belong) to the PCC group, to the base station BS through the PUCCH of the PCC, and transmits the uplink control information associated with the serving CC(s), which belongs (or belong) to the SCC group of the special SCC, to the base station BS through the PUCCH of the special SCC. In other words, if the plurality of time advance groups are configured, according to the present invention, the user equipment UE may transmit the PUCCH even on the special SCC as well as the PCC, and the base station BS may receive the PUCCH even on the special SCC as well as the PCC from the user equipment UE.

In the meantime, the present invention suggests an embodiment that the base station may configure the user equipment UE to selectively perform radio link monitoring for the special SCC, or suggests an embodiment that the user equipment UE performs radio link monitoring for the special SCC. In other words, although the user equipment UE performs radio link monitoring for the PCC only in the existing wireless system, according to this embodiment, the user equipment UE may perform radio link monitoring for the special SCC as well as the PCC. However, the user equipment UE according to this embodiment does not perform radio link monitoring for the normal SCC in the same manner as the user equipment UE according to the existing wireless system.

Also, the present invention suggests an embodiment that the base station BS sets the user equipment UE to selectively determine radio link failure for the special SCC, or suggests an embodiment that the user equipment UE selectively determines radio link failure for the special SCC. Although the user equipment UE determines radio link failure for the PCC only in the existing wireless system, the user equipment UE according to this embodiment may selectively determine radio link failure for the special SCC as well as the PCC. The user equipment UE, which has determined radio link failure for the special SCC, may release configuration of all the serving CC(s) within the SCC group to which the special SCC belongs. The released configuration may include PUCCH configuration of the special SCC. However, although radio link failure for the special SCC is determined, the configuration of the serving CC(s) of the other time advance group not the time advance group to which the special SCC belongs is maintained as far as radio link failure for the PCC is not determined, and the user equipment UE does not enter the RRC idle state (RRC_IDLE). If the radio link failure for the PCC is determined, the base station BS and the user equipment UE release connection of all the serving CC(s) configured in the user equipment UE, and the user equipment UE enters the RRC idle state.

Also, the present invention suggests an embodiment that the special SCC is designated as a reference serving CC of path loss for the SCC group to which the special SCC belongs. The user equipment UE calculates downlink path loss for each serving CC configured in the user equipment UE, and reflects the downlink path loss in determination of the uplink transmission power. The base station BS selects the special SCC as a reference serving SCC used to determine a reference signal power for the SCC group to which the special SCC belongs, and transmits the selected one to the user equipment UE. The user equipment UE may calculate path loss of the SCC(s) within the SCC group with reference to the path loss of the special SCC of the SCC group.

Also, the present invention suggests an embodiment that the user equipment UE and the base station BS release or deactivate the configuration of all the serving CC(s) including the special SCC of the corresponding time advance group if the user equipment UE determines that the random access procedure to the special SCC has been failed. The user equipment UE according to this embodiment may report the fact that the random access procedure to the special SCC has been failed, to the base station BS. If the random access procedure to the special SCC is failed, the user equipment triggers or starts the random access procedure to the PCC to continue to perform the random access procedure. The user equipment UE may determine that the random access procedure is failed if retransmission of the random access preamble by means of the user equipment reaches the maximum value set by the base station BS.

Also, the present invention suggests an embodiment that release for the special SCC is interpreted as release of all the serving CCs within the SCC group to which the special SCC belongs. If the user equipment UE receives a command to release the special SCC from the base station BS, it releases all the serving CC(s) within the SCC group to which the special SCC belongs, as well as the special SCC.

Also, the present invention suggests an embodiment that the user equipment UE reports transmission power information related to the time advance group to the base station BS in reporting the power headroom of the user equipment UE to the base station BS. For example, the transmission power information per time advance group may be a sum of transmission powers that may be used in the corresponding time advance group. In other words, the transmission power information may be reported from the user equipment UE to the base station BS in the form of $P_{CMAX,c}$ per group (hereinafter, referred to as $P_{CMAX,g}$). The user equipment UE may report the $P_{CMAX,g}$ to the base station BS through MAC CE for the power headroom report (PHR) described with reference to FIG. 12.

Also, the present invention suggests an embodiment that one deactivation timer is set per time advance group. In the existing system, the deactivation timer is set per SCC, whereas the deactivation timer is set per time advance group in the present invention. Also, the same value is applied to each SCC in the existing system even though the deactivation timer is set per SCC, a respective value may be applied to each group in the present invention. Accordingly, UE complexity may be reduced. The base station BS may set and transmit one deactivation timer per SCC group of the user equipment UE. The base station BS may set the deactivation timer for the special SCC only in the SCC group and transmit the set timer to the user equipment UE, and may not set the deactivation timer for the other SCC(s) within the SCC group. If the special SCC is activated, the user equipment UE initiates the deactivation timer for the special SCC. The user equipment UE may resume the deactivation timer of the special SCC only if the PDCCH related to the special SCC is received. If the deactivation timer of the special SCC expires, the user equipment UE may deactivate all the serving CC(s) within the SCC group to which the special SCC belongs, as well as the special SCC. The base station BS may set the deactivation timer per SCC for the SCC(s) to which the special SCC belongs and transmit the set deactivation timer to the user equipment UE, or may set one deactivation timer for the PCC group and transmit the set deactivation timer to the user equipment UE. If the deactivation timer of the SCC which belongs to the PCC group expires, the user equipment UE may deactivate the SCC which belongs to the PCC group.

Figure 13:
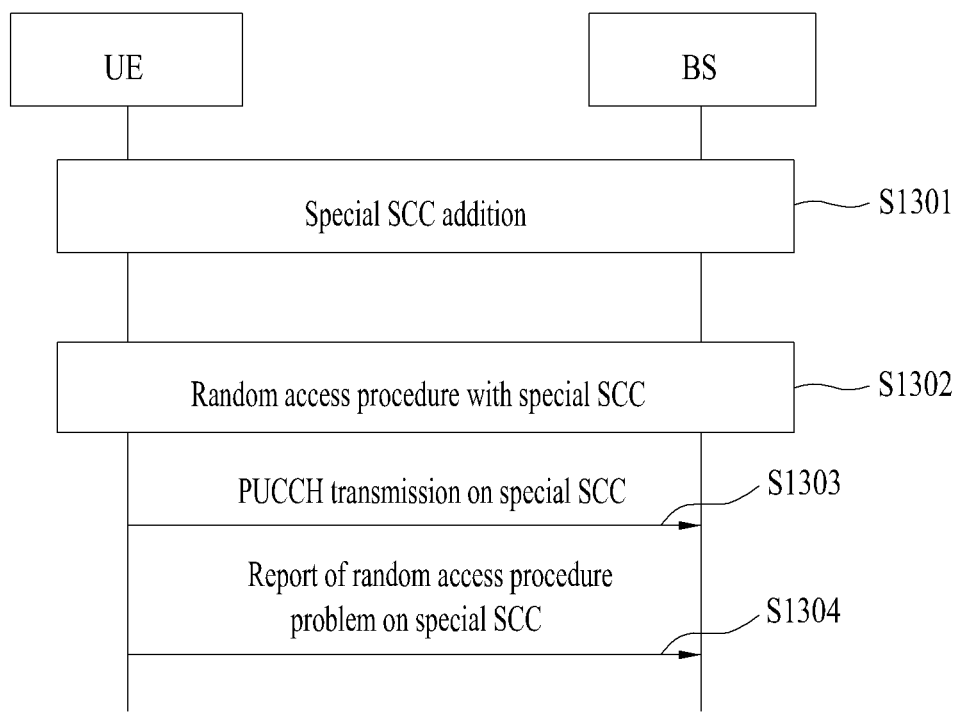
FIG. 13 is a diagram illustrating a random access procedure according to the embodiments of the present invention.

FIG. 13 is a diagram illustrating a random access procedure according to the embodiments of the present invention.

Referring to FIG. 13, the base station BS adds the special SCC (that is, special SCell) through the RRC signal (S1301). The base station BS may designate the SCC as the special SCC while adding the SCC, or may set the special one of the SCCs configured as the serving CCs and indicate the special SCC to the user equipment UE. The RRC signal related to addition or setting of the special SCC may include information related to the deactivation timer, which will be used in the SCC group configured by the special SCC. Also, the RRC signal may include a related parameter that allows the user equipment UE to perform the random access procedure on the special SCC.

The user equipment UE performs the random access procedure by using the SCC only indicated as the special SCC of the SCCs within the SCC group to acquire the TAC for the SCC group (S1302). In more detail, the user equipment UE may transmit the random access preamble to the base station BS on the special SCC, and may receive the random access response, which includes the random access preamble identifier corresponding to the random access preamble, from the base station BS. The random access response may be received on the special SCC. The user equipment UE may apply the TAC within the random access response to the SCC(s) within the SCC group. If the user equipment has a plurality of SCC groups, it performs the random access procedure to the special SCC of the corresponding SCC group and acquires the TAC for each SCC group. The user equipment UE may acquire the TAC for the PCC group by performing the random access procedure to the PCC. In more detail, the user equipment may transmit the random access preamble to the base station BS on the PCC, and may receive the random access response, which includes the random access preamble identifier corresponding to the random access preamble, from the base station BS. The random access response may be received on the PCC. The user equipment UE may apply the TAC within the random access response to the PCC within the PCC group, and the SCC(s) if any.

The user equipment UE transmits the PUCCH(s) carrying the uplink control information associated with the SCC(s) belonging to the SCC group, to the base station BS on the special SCC (S1303). The user equipment UE may transmit the uplink control information associated with the serving CC(s) belonging to the PCC group on the PUCCH(s) through the PCC. PUCCH transmission on the special SCC may include CSI, HARQ feedback information, etc., which are associated with all the SCCs within the SCC group configured as the SCCs based on the same time advance as that of the special SCC. The PUCCH transmission on the PCC may include CSI, HARQ feedback information, etc., which are associated with all the serving CCs within the PCC group configured as the serving CCs based on the same time advance as that of the PCC. The uplink control information of the serving CCs within one time advance group may be transmitted or received on one PUCCH, or may be transmitted or received to or from the base station BS on the respective PUCCH per serving CC.

If there is a problem in the random access procedure to the special SCC, the user equipment UE may report the problem to the base station through the RRC signal (S1304).

Figure 14:
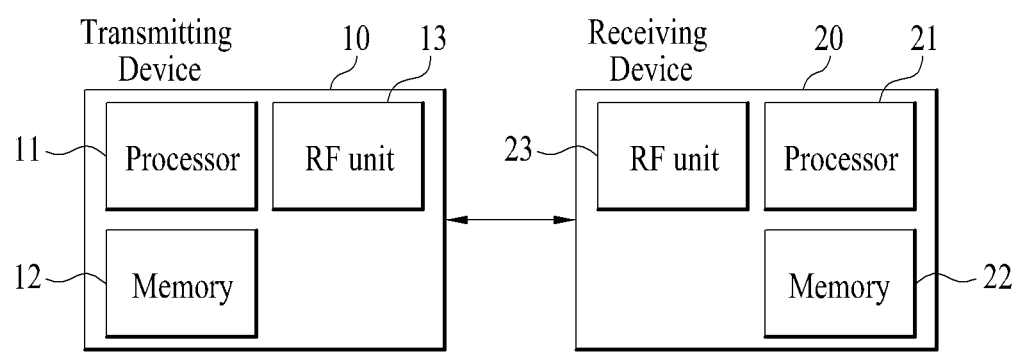
FIG. 14 is a block diagram illustrating a transmission apparatus 10 and a reception apparatus 20, which perform the present invention.

FIG. 14 is a block diagram illustrating a transmission apparatus 10 and a reception apparatus 20, which perform the present invention.

The transmission apparatus 10 and the reception apparatus 20 respectively include a radio frequency (RF) unit 13, 23 for transmitting or receiving a radio signal carrying information and/or data, signal or message, a memory 12, 22 storing various kinds of information related to communication within a wireless communication system, and a processor 11, 21 connected with the RF unit 13, 23 and the memory 12, 22 and configured to control the memory 12, 22 and/or the RF unit 13, 23 to allow the corresponding apparatus to perform at least one of the aforementioned embodiments of the present invention.

The memory 12, 22 may store a program for processing and control of the processor 11, 21 and temporarily store input/output information. The memory 12, 22 may be used as a buffer.

The processor 11, 21 generally controls the overall operation of various modules of the transmission apparatus or the reception apparatus. In particular, the processor 11, 21 may perform a controller function for implementing the aforementioned embodiments of the present invention. The processor 11, 21 may be referred to as a controller, a microcontroller, a microprocessor, and a microcomputer. The processor 11, 21 may be implemented by hardware, firmware, software, or their combination. If the present invention is implemented by hardware, application specific integrated circuits (ASICs), digital signal processors (DSPs), digital signal processing devices (DSPDs), programmable logic devices (PLDs), and field programmable gate arrays (FPGAs), which are configured to perform the present invention, may be provided in the processor 11, 21. Meanwhile, if the present invention is implemented by firmware or software, the firmware or software may be configured to include a module, a procedure, or a function, which performs functions or operations of the present invention. The firmware or software configured to perform the present invention may be provided in the processor 11, 21 or may be stored in the memory 12, 22 and then may be driven by the processor 11, 21.

The processor 11 of the transmission apparatus 10 performs predetermined coding and modulation for a signal and/ or data scheduled from the processor 11 or a scheduler connected with the processor 11 and transmitted to the outside, and then the coded and modulated data to the RF unit 13. For example, the processor 11 converts desired data streams into K number of layers through demultiplexing, channel coding, scrambling, modulation, etc. The coded data streams may be referred to as codewords, and are equivalent to transport blocks which are data blocks provided by a medium access control (MAC) layer. One transport block (TB) is coded into one codeword, wherein each codeword is transmitted to the reception apparatus in a type of one or more layers. For frequency uplink conversion, the RF unit 13 may include an oscillator. The RF unit 13 may include $N_t$ number ($N_t$ is a positive integer greater than 1) of transmitting antennas.

A signal processing procedure of the reception apparatus 20 is configured by an inverse procedure of the signal processing procedure of the transmission apparatus 10. Under the control of the processor 21, the RF unit 23 of the reception apparatus 20 receives a radio signal transmitted by the transmission apparatus 10. The RF unit 23 may include $N_r$ number of receiving antennas. The RF unit 23 frequency down-coverts each of the signals received through the receiving antennas to recover baseband signals. The RF unit 23 may include an oscillator for frequency down-conversion. The processor 21 may perform decoding and demodulation for the radio signals received through the receiving antennas to recover data originally intended to be transmitted from the transmission apparatus 10.

The RF unit 13, 23 includes one or more antennas. The antennas may transmit the signals processed by the RF unit 13, 23 to the outside or receive the radio signals from the outside and transfer the radio signals to the RF unit 13, 23 under the control of the processor 11, 21 in accordance with one embodiment of the present invention. The antennas may be referred to as antenna ports. Each antenna may correspond to one physical antenna or may be configured by combination of physical antenna elements more than one. The signal transmitted from each antenna cannot be decomposed any more by the reception apparatus 20. The reference signal (RS) transmitted to correspond to the corresponding antenna defines the corresponding antenna in view of the reception apparatus 20, and allows the reception apparatus 20 to perform channel estimation for the antenna regardless of the fact that the channel is a single radio channel from one physical antenna or a composite channel from a plurality of physical antenna elements including the above antenna. In other words, the antenna is defined such that a channel transferring symbols on the antenna may be obtained from the channel to which other symbols on the same antenna are transferred. The RF unit that supports a multi-input multi-output (MIMO) function for transmitting and receiving data using a plurality of antennas may be connected with two or more antennas.

In the embodiments of the present invention, the user equipment UE is operated as the transmission apparatus 10 on the uplink and as the reception apparatus 20 on the downlink. In the embodiments of the present invention, the base station BS is operated as the reception apparatus 20 on the uplink and as the transmission apparatus 10 on the downlink.

The processor (hereinafter, referred to as BS processor) of the base station BS according to the present invention may group the uplink CCs configured in the user equipment, which is configured with carrier aggregation, as one or more time advance groups in accordance with frequency features. The BS processor may configure the PCC group by using the PCC and the SCC(s) having the same frequency features as those of the PCC, and if the SCC(s) having the frequency features different from those of the PCC, that is, the SCC(s), which cannot use the same time advance as that of the PCC, exist, the BS processor may configure one or more SCC groups by using the SCC(s). If the SCCs, which cannot use the same time advance as that of the PCC, have different frequency features, these SCCs may be configured different SCC groups. The BS processor may configure one special SCC per SCC group, and may indicate the special SCC for each SCC group to the user equipment UE by controlling the RF unit (hereinafter, referred to as BS RF unit) of the base station BS. The BS processor according to one embodiment of the present invention may control the BS RF unit to transmit RRC signal indicating whether the corresponding SCC is the special SCC or normal SCC, when adding the SCC as the serving CC for the user equipment UE. If the SCC is used as the normal SCC and is not included in the PCC group, the BS processor may control the BS RF unit to transmit RRC signal indicating which group includes the SCC, to the user equipment UE. The RF unit (hereinafter, referred to as UE RF unit) of the user equipment UE may receive RRC signal(s) from the base station BS, and may identify the time advance group(s) and the serving CC which will be a reference of the time advance in each time advance group. The UE processor may control the user equipment UE RF unit to perform the random access procedure by using the PCC for the serving CC(s) belonging to the PCC group, and may acquire the TAC for the PCC group on the PCC. For the serving CC(s) belonging to the SCC group, the UE processor may control the user equipment UE RF unit to perform the random access procedure by using the serving CC set as the special SCC within the corresponding SCC group, and may acquire the TAC for the corresponding SCC group on the special SCC of the corresponding SCC group. The UE processor applies the TAC received on the PCC to the serving CC(s) belonging to the PCC group and applies the same time alignment timer to all the serving CCs belonging to the PCC group, so as to manage the uplink time advance. Also, the UE processor applies the TAC received on the special SCC of the SCC group to the serving CC(s) belonging to one SCC group and applies the same time alignment timer to all the serving CCs belonging to the SCC group, so as to manage the uplink time advance. The UE processor may apply different TACs and/or different time alignment timers to the serving CCs belonging to different time advance groups.

Also, the BS processor according to one embodiment of the present invention may control the BS RF unit to transmit RRC signal indicating PUCCH resource, which will be used on the special SCC, to the user equipment UE. The processor of the user equipment, which includes a plurality of time advance groups, controls the user equipment UE RF unit to transmit uplink control information associated with the serving CC(s) belonging to the PCC group to the base station through the PUCCH(s) of the PCC, and transmits uplink control information associated with the serving CC(s) belonging to the SCC group to the base station BS through the PUCCH(s) of the special SCC.

Also, the BS processor according to one embodiment of the present invention may configure the user equipment UE to selectively perform radio link monitoring for the special SCC. Alternatively, the user equipment UE may selectively perform radio link monitoring for the special SCC. The UE processor according to one embodiment of the present invention may perform radio link monitoring for the special SCC as well as the PCC.

Also, the BS processor according to one embodiment of the present invention may configure the user equipment UE to selectively determine radio link failure for the special SCC. Alternatively, the user equipment UE may selectively determine radio link failure for the special SCC. In other words, the UE processor according to one embodiment of the present invention may selectively determine radio link failure for the special SCC as well as the PCC. If the UE processor determines radio link failure for the special SCC, it may release configuration of all the serving CC(s) within the SCC group to which the special SCC belongs.

Also, if the random access procedure to the special SCC is failed, the UE processor and the BS processor according to one embodiment of the present invention may release or deactivate the configuration of all the serving CC(s) including the special SCC of the corresponding SCC group. If the random access procedure to the special SCC is failed, the UE processor according to one embodiment of the present invention may report the fact that the random access procedure to the special SCC has been failed, to the base station BS. If the BS RF unit receives the report that the random access procedure to the special SCC has been failed, from the user equipment UE, the BS processor may control the BS RF unit to transmit RRC signal releasing the configuration of all the serving CC(s) of the SCC group to which the special SCC belongs or MAC signal deactivating the configuration to the user equipment UE. If the random access procedure to the special SCC is failed, the UE processor may trigger or start the random access procedure to the PCC. The UE processor may determine that the random access procedure is failed if retransmission of the random access preamble by means of the user equipment UE reaches the maximum value set by the base station BS.

Also, the BS processor according to one embodiment of the present invention may command the user equipment UE to release or deactivate all the serving CC(s) within the SCC group to which the special SCC belongs, by commanding the user equipment UE to release or deactivate the special SCC. The BS processor may command the user equipment UE to release the configuration of all the serving CC(s) within the SCC group by controlling the BS RF unit to transmit RRC signal, which releases the configuration of the serving CC configured as the special SCC in the SCC group, to the user equipment UE. The BS processor may deactivate all the serving CC(s) within the SCC group by controlling the BS RF unit to transmit MAC signal, which indicates deactivation of the serving CC configured as the special SCC in the SCC group, to the user equipment UE. If the UE RF unit receives the signal indicating release (or deactivation) for the special SCC from the base station BS, the UE processor may release (or deactivate) all the serving CC(s) within the SCC group to which the special SCC belongs.

Also, the BS processor according to one embodiment of the present invention may configure one deactivation timer per time advance group and transmit the deactivation timer per time advance group to the user equipment UE by controlling the BS RF unit. UE RF unit may receive the deactivation timer per time advance group from the base station BS. If the special SCC is activated, the UE processor initiates the deactivation timer for the special SCC. Also, the UE processor may resume the deactivation timer of the special SCC only if the PDCCH signal related to the special SCC is received. If the deactivation timer of the special SCC expires, the UE processor may deactivate all the serving CC(s) within the SCC group to which the special SCC belongs. The BS processor may set the deactivation timer per SCC belonging to the PCC group and control the BS RF unit to transmit the deactivation timer per SCC within the PCC group, or may set one deactivation timer for the PCC group and control the BS RF unit to transmit one deactivation timer for the PCC group to the user equipment UE. If the deactivation timer of the SCC belonging to the PCC group expires, the UE processor may deactivate the SCC belonging to the PCC group.

In the embodiments of the present invention, although the PCC (that is, PCell) and the special SCC (that is, special SCell) may be used for the random access procedure, they are identified from each other in view of the following aspects. Since the SCC is configured after RRC connection is established, the special SCC may be configured only if the user equipment UE is in the RRC connection state. Accordingly, the PCC may be used when the user equipment UE of the RRC idle state enters the RRC connection state, whereas the special SCC cannot be used when the user equipment of the RRC idle state enters the RRC connection state. Also, although the user equipment UE which is in the RRC connection state has one PCC, the special SCC may exist as much as the number of SCC groups configured in the user equipment UE. Also, special downlink control information is transmitted or received through the PCC only. For example, the user equipment UE applies system information acquisition procedure to the PCC only. For another example, non access stratum (NAS) mobility information and security input are transmitted or received through the PCC only. Also, in order to generate a security parameter for ciphering, the PDCP layer uses a physical cell identifier (PCI) of the PCC, and does not use the PCI of the SCC including the special SCC. Also, if the user equipment UE includes a plurality of serving CCs, the base station may activate or deactivate the special SCC but cannot deactivate the PCC. The special SCC is deactivated at the time when it is added as the serving CC and immediately after handover is performed, the serving CC which is the PCC is activated and is not deactivated as far as the PCC is not changed to another serving CC.

According to the present invention, the uplink CCs operated on the frequencies within different frequency bands and/or the uplink CCs operated on the frequencies based on the antennas of different locations may be aggregated. Also, different time advances may be applied to the uplink CCs having different frequency features.

Those skilled in the art will appreciate that the present invention may be carried out in other special ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments of the present invention may be applied to the base station, the user equipment, other equipment in the wireless communication systems.

The invention claimed is:
1. A method for transmitting, by a user equipment configured with a plurality of cells, an uplink signal to a base station, the method comprising:
receiving information indicating a special secondary cell (SCell) for a random access procedure, among one or more SCells within an SCell group comprised of the one or more SCells of the plurality of cells, from the base station;

performing the random access procedure on the special SCell; and transmitting an uplink signal for the one or more SCells within the SCell group to the base station on the special SCell through a physical uplink control channel (PUCCH), wherein the SCell group is different from a primary cell (PCell) group which includes at least a PCell of the plurality of cells.

2. The method according to claim 1, further comprising:
receiving a timing advance command (TAC) for the special SCell from the base station in response to the random access procedure performed on the special SCell, and applying the TAC to every cell within the SCell group.

3. The method according to claim 2, further comprising:
receiving information indicating release of the special SCell from the base station; and
releasing every cell within the SCell group.

4. The method according to claim 2, further comprising:
receiving information indicating deactivation of the special SCell from the base station; and
deactivating every cell within the SCell group.

5. The method according to claim 4, further comprising:
receiving a deactivation timer for the special SCell from the base station; and
applying the deactivation timer to every cell within the SCell group.

6. The method according to claim 1, further comprising:
releasing or deactivating every cell within the SCell group in case of radio link failure for the special SCell.

7. A method for receiving, by a base station, an uplink signal from a user equipment configured with a plurality of cells, the method comprising:

transmitting information indicating a special secondary cell (SCell) for a random access procedure, among one or more SCells within an SCell group comprised of the one or more SCells of the plurality of cells, to the user equipment;

performing the random access procedure with the user equipment on the special SCell; and receiving an uplink signal for the one or more SCells within the SCell group from the user equipment on the special SCell through a physical uplink control channel (PUCCH), wherein the SCell group is different from a primary cell (PCell) group which includes at least a PCell of the plurality of cells.

8. The method according to claim 7, further comprising:
transmitting a timing advance command (TAC) for the special SCell to the user equipment in response to the random access procedure performed on the special SCell.

9. The method according to claim 8, further comprising:
transmitting information indicating release of the special SCell to the user equipment; and
releasing every cell within the SCell group.

10. The method according to claim 8, further comprising:
transmitting information indicating deactivation of the special SCell to the user equipment, and
deactivating every cell within the SCell group.

11. The method according to claim 10, further comprising:
transmitting a deactivation timer for the special SCell to the user equipment for every cell within the SCell group.

12. A user equipment, which is configured with a plurality of cells, for transmitting an uplink signal to a base station, the user equipment comprising:

a radio frequency (RF) unit configured to transmit or receive a radio signal; and a processor configured to control the RF unit, wherein the processor controls the RF unit to receive information indicating a special secondary cell (SCell) for a random access procedure, among one or more SCells within an SCell group comprised of the one or more SCells of the plurality of cells, from the base station, controls the RF unit to perform the random access procedure on the special SCell, and controls the RF unit to transmit an uplink signal for the one or more SCells within the SCell group to the base station on the special SCell through a physical uplink control channel (PUCCH), wherein the SCell group is different from a primary cell (PCell) group which includes at least a PCell of the plurality of cells.

13. A base station for receiving an uplink signal from a user equipment, which is configured with a plurality of cells, the base station comprising:

a radio frequency (RF) unit configured to transmit or receive a radio signal; and a processor configured to control the RF unit, wherein the processor controls the RF unit to transmit information indicating a special secondary cell (SCell) for a random access procedure, among one or more SCells within an SCell group comprised of the one or more SCells, to the user equipment, and controls the RF unit to perform the random access procedure with the user equipment on the special SCell, and controls the RF unit to receive an uplink signal for the one or more SCells within the SCell group from the user equipment on the special SCell through a physical uplink control channel (PUCCH), wherein the SCell group is different from a primary cell (PCell) group which includes at least a PCell of the plurality of cells.

* * * * *